(12) United States Patent
Cho et al.

(10) Patent No.: US 11,780,294 B2
(45) Date of Patent: Oct. 10, 2023

(54) AIR CONDITIONING DEVICE FOR VEHICLE

(71) Applicants: Hyundai Motor Company, Seoul (KR); Kia Corporation, Seoul (KR); NIFCO KOREA Inc., Asan-si (KR); NVH KOREA, INC., Ulsan (KR)

(72) Inventors: Min Ho Cho, Suwon-si (KR); Ji Ah Kim, Seoul (KR); Jin Ho Hwang, Cheonan-si (KR); Chi Bong Oh, Hwaseong-si (KR); Geun Heung Kim, Asan-si (KR)

(73) Assignees: HYUNDAI MOTOR COMPANY, Seoul (KR); KIA CORPORATION, Seoul (KR); NIFCO KOREA INC., Asan-si (KR); NVH KOREA, INC., Ulsan (KR)

( * ) Notice: Subject to any disclaimer, the term of this patent is extended or adjusted under 35 U.S.C. 154(b) by 0 days.

(21) Appl. No.: 17/452,829

(22) Filed: Oct. 29, 2021

(65) Prior Publication Data

US 2022/0371407 A1 Nov. 24, 2022

(30) Foreign Application Priority Data

May 20, 2021 (KR) .................. 10-2021-0064477

(51) Int. Cl.
*B60H 1/26* (2006.01)
*B60H 1/24* (2006.01)
(Continued)

(52) U.S. Cl.
CPC .......... *B60H 1/265* (2013.01); *B60H 1/0065* (2013.01); *B60H 1/00842* (2013.01); *B60H 1/243* (2013.01); *B60H 1/3407* (2013.01)

(58) Field of Classification Search
CPC .. B60H 1/265; B60H 1/0065; B60H 1/00842; B60H 1/243; B60H 1/3407;
(Continued)

(56) References Cited

U.S. PATENT DOCUMENTS

| | | | |
|---|---|---|---|
| 9,267,658 B2 | 2/2016 | Garcez da Silva | |
| 2004/0089007 A1* | 5/2004 | Umebayashi | B60H 1/247 62/244 |
| 2011/0028077 A1 | 2/2011 | Ludwig | |

FOREIGN PATENT DOCUMENTS

| | | | |
|---|---|---|---|
| DE | 19707405 A1 * | 8/1998 | B60H 1/00685 |
| KR | 101008453 B1 | 1/2011 | |

(Continued)

OTHER PUBLICATIONS

English translation, KR-2012129113-A, Nov. 2012 (Year: 2012).*
English translation, DE-19707405-A1, Aug. 1998 (Year: 1998).*
English translation, WO-2014103610-A1, Jul. 2014 (Year: 2014).*

*Primary Examiner* — Jessica Yuen
(74) *Attorney, Agent, or Firm* — MCDONNELL BOEHNEN HULBERT & BERGHOFF LLP

(57) ABSTRACT

The present disclosure provides an air conditioning device for a vehicle. The air conditioning device includes an air conditioning unit disposed in at least one of front or rear of the vehicle. The air conditioning device further includes a duct unit blowing air of the air conditioning unit into an interior and extending inside of at least one of a front pillar or a rear pillar. The air conditioning device further includes a vent unit communicating with the duct unit through a connecting duct and selectively opening and closing a discharge path of at least one of a main path, a first path, or a second path so as to discharge the blown air to a side of a roof frame.

9 Claims, 16 Drawing Sheets

(51) Int. Cl.
*B60H 1/00* (2006.01)
*B60H 1/34* (2006.01)

(58) Field of Classification Search
CPC ............ B60H 2001/3478; B60H 1/245; B60H 1/3414; B60H 1/247; B60H 1/00028; B60H 1/00564; B60H 1/3428; B60H 1/345; B60H 2001/00185
See application file for complete search history.

(56) References Cited

FOREIGN PATENT DOCUMENTS

| | | | | |
|---|---|---|---|---|
| KR | 2012129113 A | * | 11/2012 | ......... B60H 1/00592 |
| KR | 20180117686 A | | 10/2018 | |
| KR | 20180127920 A | | 11/2018 | |
| KR | 20190047192 A | | 5/2019 | |
| WO | WO-2014103610 A1 | * | 7/2014 | ......... B60H 1/00742 |

* cited by examiner

AIR CONDITIONING DEVICE FOR VEHICLE

CROSS-REFERENCE TO RELATED APPLICATION

This application claims under 35 U.S.C. § 119(a) the benefit of priority to Korean Patent Application No. 10-2021-0064477 filed on May 20, 2021, the entire contents of which are incorporated herein by reference.

TECHNICAL FIELD

The present disclosure relates to an air conditioning device for a vehicle, and more particularly, to an air conditioning device for a vehicle, which can provide an occupant with a pleasant environment by changing a direction of wind being supplied to a vehicle interior through a rotary dial operation in configuring a roof vent connected to a front-seat air conditioner and a rear-seat air conditioner.

BACKGROUND

In general, an autonomous vehicle is a vehicle that drives automatically and can perform an existing main transport function, and such an autonomous vehicle can detect a surrounding environment without human intervention, and can perform an automatic navigation operation. At present, a vehicle being driven by a robot exists as a prototype.

Such an autonomous vehicle is provided with detection means, such as LIDAR, GPS, and computer vision technology, to detect the surrounding environment of the vehicle, and more advanced detection means can interpret not only a corresponding navigation path but also an identification means, such as a sign related to an obstacle.

In addition, the autonomous vehicle is required to automatically update a map in accordance with a sensor input so as to keep the path even in a non-registered environment or in a situation where the condition has changed.

A currently developed autonomous vehicle includes long range/short range radar, stereo camera, and adaptive cruise control technology on the front to implement driverless driving, and more specifically, in the autonomous vehicle, active cruise control (ACC) and active brake assist (ABA) control driving and decelerating using the long range/short range radar, and automatically adjust a distance between vehicles.

Meanwhile, as an example, the long range radar searches up to 250 m ahead at a viewing angle of 18°, and the short range radar searches up to 70 m ahead at a viewing angle of 130°.

Further, a stereo camera is attached to front glass of the vehicle, and recognizes lane marking by searching up to 100 m at a viewing angle of 45° horizontal −27° vertical.

In addition, a highway pilot system detects surroundings of the vehicle in real time by providing functions of lane keeping, collision avoidance, speed control, and deceleration through connection of the front radar and the stereo camera.

In addition to such self-detection of vehicle surrounding environment in real time, a prediction system through a high-definition map operates using a global positioning system (GPS), and all configurations as above enable the vehicle driving in a manner that a computer, rather than human, actually controls a vehicle driving device through comprehensive judgment.

As described above, with the appearance of new technology related to an autonomous vehicle, new technology is required to be applied even to an inner air conditioning device of the autonomous vehicle to provide occupant's convenience, and as the time for introduction and availability of the autonomous vehicle gets near, there has been a need for introduction of an air conditioning device to cope with changes of the vehicle interior.

The above information disclosed in this background section is only for enhancement of understanding of the background of the present disclosure and therefore it may contain information that does not form the prior art that is already known in this country to a person of ordinary skill in the art.

SUMMARY

The present disclosure is proposed for solving the above problems, and provides an air conditioning device for a vehicle, which can set a cooling environment suitable for an occupant through providing of various cooling modes in a manner that in configuring a roof vent connected through a front air conditioner, a rear air conditioner, a tube duct, and a connecting duct, an upper shutter and a lower shutter for shielding a roof duct operate selectively in accordance with adjustment of a rotation angle of a rotary dial, and accordingly, a cooling mode of a vehicle interior is set to an upward mode, a downward mode, or a windless mode.

The objects of the present disclosure are not limited to those as described above, and other unmentioned objects of the present disclosure can be clearly understood from the following description by those of ordinary skill in the art to which the present disclosure pertains (hereinafter, "ordinary technicians").

In one aspect of the present disclosure, an air conditioning device for a vehicle includes: an air conditioning unit disposed in at least one of front or rear of the vehicle; a duct unit blowing air of the air conditioning unit into an interior and extending inside of at least one of a front pillar or a rear pillar; and a vent unit communicating with the duct unit through a connecting duct and selectively opening and closing a discharge path of at least one of a main path, a first path, or a second path so as to discharge the blown air to a side of a roof frame.

The vent unit includes an outer housing part connected to the connecting duct; an inner housing part mounted inside the outer housing part and forming the discharge path; a first shutter part rotatably mounted inside the outer housing part and selectively blocking the second path; and a second shutter part rotatably mounted inside the outer housing part and selectively blocking the first path.

Here, the vent unit further includes a windless grille part combined to cover a front side of the main path and provided with a plurality of fine discharge holes through which the air in the main path is discharged.

Further, the vent unit is switched to a normal mode for blocking the main path through the first shutter part and the second shutter part in accordance with a user's operation.

Further, the vent unit is switched to an upward mode for selectively blocking the second path by rotating the first shutter part in accordance with a user's operation.

Further, the vent unit is switched to a downward mode for selectively blocking the first path by rotating the second shutter part in accordance with a user's operation.

Further, the vent unit is switched to a windless mode for selectively blocking the first path and the second path by rotating the first shutter part and the second shutter part in accordance with a user's operation.

Meanwhile, the vent unit further includes a rotation adjustment part connected to the first shutter part and the second shutter part together, and being rotated around a center shaft.

The adjustment part includes an operation dial having a part exposed out of the vent unit and being rotatably provided; a first operation guide accommodating therein a first transmission shaft connected to a rotation shaft of the first shutter part and guiding an operation of the first shutter part by moving the first transmission shaft depending on rotation of the operation dial in one direction; and a second operation guide accommodating therein a second transmission shaft connected to a rotation shaft of the second shutter part and guiding an operation of the second shutter part by moving the second transmission shaft depending on rotation of the operation dial in the other direction.

Here, the first operation guide includes a first operation path for blocking the second path through the first shutter part by guiding the movement of the first transmission shaft through a bent part depending on the rotation of the operation dial in the one direction; and a second operation path extending from the first operation path, and maintaining a blocking state of the second path through the first shutter part by guiding the movement of the first transmission shaft depending on an additional rotation of the operation dial in the one direction.

Further, the second operation guide makes the first path blocked through the second shutter part by moving the second transmission shaft depending on the movement of the first transmission shaft from the first operation path to the second operation path.

Meanwhile, the vent unit is formed to be divided into a front seat vent and a rear seat vent on the side of the roof frame, wherein the front seat vent is connected to the air conditioning unit disposed in the front of the vehicle, and the rear seat vent is connected to the air conditioning unit disposed in the rear of the vehicle.

Further, in an air conditioning device for a vehicle according to the present disclosure, a vent unit includes: a duct; an outer housing part connected to the duct; an inner housing part formed so that at least a part thereof is surrounded by the outer housing part; and a windless grille part located in an opening of the inner housing part and having a windless area formed therein, wherein the vent unit further includes a first discharge path and a second discharge path formed between the outer housing part and the inner housing part, and wherein the first discharge path and the second discharge path are configured to surround at least a part of the windless area.

According to the present disclosure, it is possible to set the cooling environment suitable for the occupant through providing of various cooling modes in a manner that in configuring the roof vent connected through the front air conditioner, the rear air conditioner, the tube duct, and the connecting duct, the upper shutter and the lower shutter for shielding a roof duct operate selectively in accordance with adjustment of the rotation angle of the rotary dial, and accordingly, the cooling mode of the vehicle interior is set to the upward mode, the downward mode, or the windless mode.

Further, according to the present disclosure, it is possible to provide the occupant with the pleasant indoor environment in a manner that the roof vent is set to be divided into the front seat vent and the rear seat vent, and in a normal node in which the autonomous driving is not used, cooling through the rear seat vent is performed through the operation of the rear air conditioner, whereas in a face-to-face mode in which autonomous driving is used, cooling through both the front seat vent and the rear seat vent is performed.

Other aspects and preferred embodiments of the present disclosure are discussed infra.

It is understood that the term "vehicle" or "vehicular" or other similar term as used herein is inclusive of motor vehicles in general such as passenger automobiles including sport utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the present disclosure are discussed infra.

BRIEF DESCRIPTION OF THE DRAWINGS

The above and other features of the present disclosure will now be described in detail with reference to certain exemplary embodiments thereof illustrated the accompanying drawings which are given hereinafter by way of illustration only, and thus are not limitative of the present disclosure, and wherein.

Figure 1:
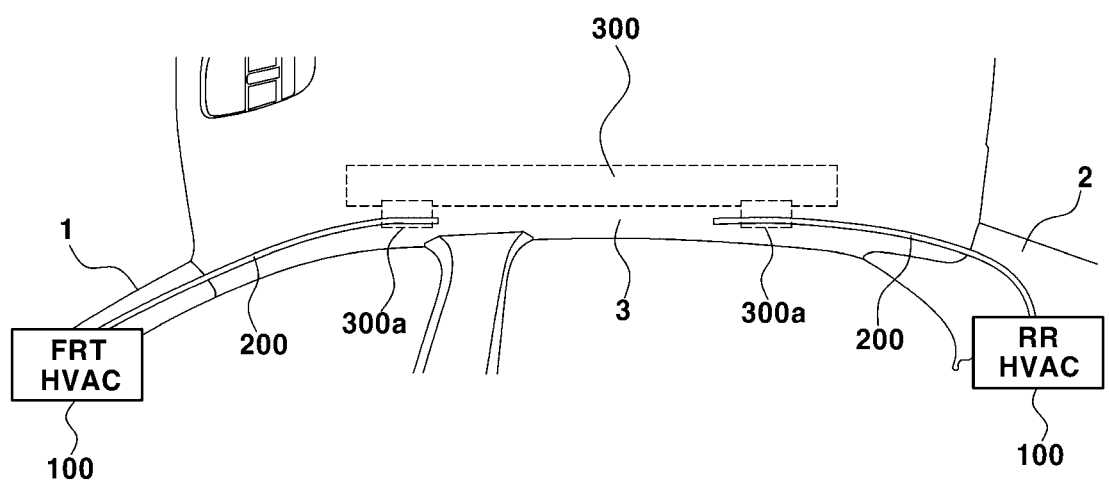
FIG. 1 is a view showing a disposition structure of an air conditioning device for a vehicle according to an embodiment of the present disclosure.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, preferred embodiments of the present disclosure will be described in detail with reference to the accompanying drawings.

The aspects and features of the disclosure and methods for achieving the aspects and features will be apparent by referring to the embodiments to be described in detail with reference to the accompanying drawings.

However, the present disclosure is not limited to the embodiments disclosed hereinafter, and it can be implemented in diverse forms. The present embodiments are provided to assist those of ordinary skill in the art in a comprehensive understanding of the disclosure, and the present disclosure is only defined within the scope of the appended claims.

Further, in describing the present disclosure, a detailed description of a related known technology will be omitted if it is deemed to make the gist of the present disclosure unnecessarily vague.

Figure 2:
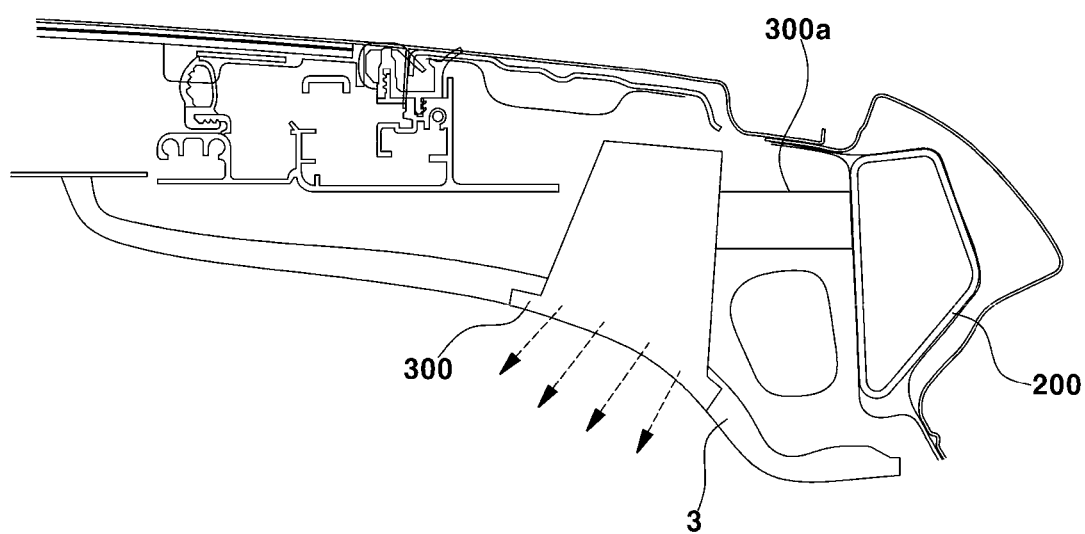
FIG. 2 is a view showing a connection structure of an air conditioning device for a vehicle according to an embodiment of the present disclosure.

FIG. 1 is a view showing a disposition structure of an air conditioning device for a vehicle according to an embodiment of the present disclosure, and FIG. 2 is a view showing a connection structure of an air conditioning device for a vehicle according to an embodiment of the present disclosure.

Figure 3:
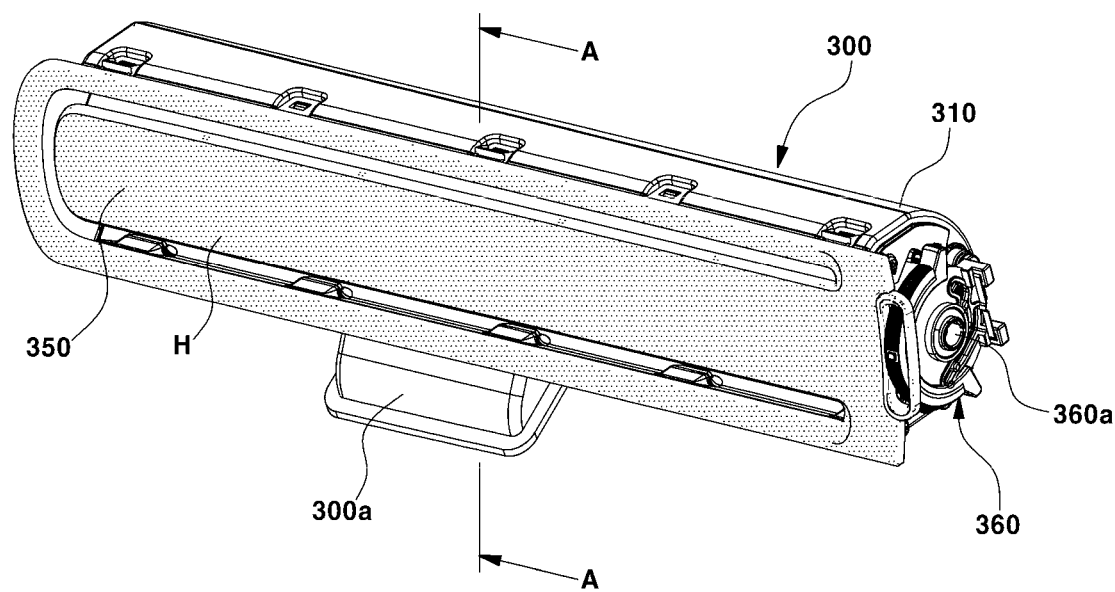
FIG. 3 is a view showing a front side of a vent unit of an air conditioning device for a vehicle according to an embodiment of the present disclosure.
Figure 4:
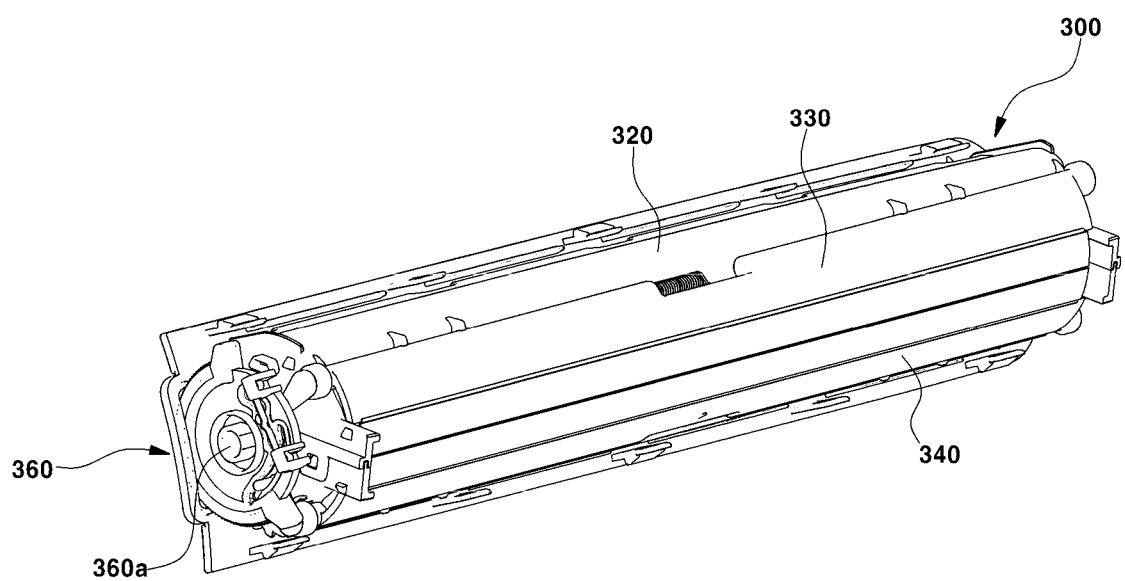
FIG. 4 is a view showing a rear side of a vent unit of an air conditioning device for a vehicle according to an embodiment of the present disclosure.

Further, FIG. 3 is a view showing a front side of a vent unit of an air conditioning device for a vehicle according to an embodiment of the present disclosure, and FIG. 4 is a view showing a rear side of a vent unit of an air conditioning device for a vehicle according to an embodiment of the present disclosure.

Figure 5:
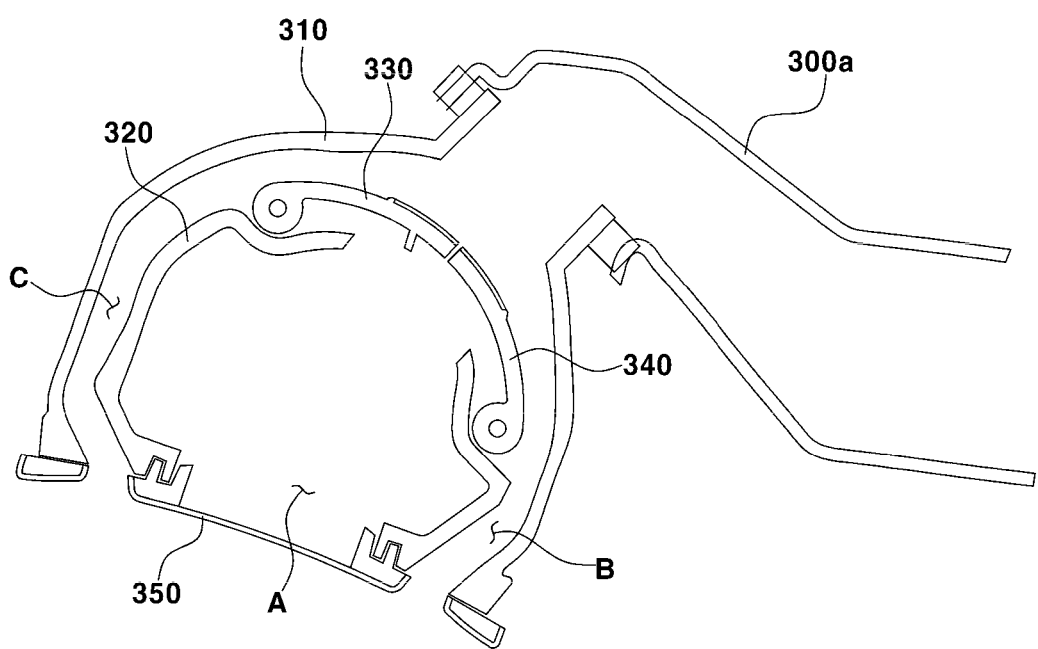
FIG. 5 is a cross-sectional view along the A-A cross section of FIG. 3 showing a structure according to a normal mode of a vent unit of an air conditioning device for a vehicle according to an embodiment of the present disclosure.

Further, FIGS. 5 and 6 are views showing a structure according to a normal mode of a vent unit of an air conditioning device for a vehicle according to an embodiment of the present disclosure.

As illustrated in FIG. 1, an air conditioning device for a vehicle according to the present embodiment includes an air conditioning unit 100, a duct unit 200, and a vent unit 300.

The air conditioning unit 100 is disposed in at least one of the front or rear of the vehicle interior, and preferably, may be composed of a general heating, ventilation & air conditioning (HVAC).

The duct unit 200 serves to blow air of the air conditioning unit 100 into the interior, and as illustrated in FIG. 2, the duct unit 200 has a predetermined length, and may extend from the interior of at least one of a front pillar 1 or a rear pillar 2 of the vehicle toward the vent unit 300.

The duct unit 200 is formed in a tube shape, and blows the air generated according to the driving of the air conditioning unit 100 toward the vehicle interior.

Further, the vent unit 300 communicates with the duct unit 200 through a connection duct 300a (refer to FIG. 2), and by selectively opening and closing a discharge path on at least one of a main path A, a first path B, or a second path C, the air blown through the duct unit 200 is discharged to the side of a roof frame 3 of the vehicle.

For this, the vent unit 300, as illustrated in FIGS. 3, 4, and 5, is provided with an outer housing part 310, an inner housing part 320, a first shutter part 330, and a second shutter part 340.

The outer housing part 310 forms an outer case of the vent unit 300, and is connected to the connection duct 300a.

The inner housing part 320 is mounted inside the outer housing part 310, and forms the discharge path, such as the main path A, the first path B, and the second path C by partitioning the inner space of the outer housing part 310.

The first shutter part 330 is rotatably mounted inside the outer housing part 310, and selectively blocks the second path C.

That is, the first shutter part 330 is formed with a length corresponding to the length in a width direction of the inner housing part 320, and is located to come in contact with an inner top side of the outer housing part 310 when being rotated in a state where it is connected to an inlet side of the inner housing part 320, so that the first shutter part 330 can selectively block the movement of the air flowing in through the connection duct 300a to the second path C.

The second shutter part 340 is rotatably mounted inside the outer housing part 310 independently of the first shutter part 330, and selectively blocks the first path B.

In the same manner as the first shutter part 330, the second shutter part 340 is formed with a length corresponding to the length in the width direction of the inner housing part 320.

Further, since the second shutter part 340 is located to come in contact with an inner bottom side of the outer housing part 310 when being rotated, the second shutter part 340 can selectively block the movement of the air flowing in through the connection duct 300a to the first path B.

Although not illustrated in the drawing, the vent unit 300 may be formed to be provided with the first shutter part 330 and the second shutter part 340 as described above, but may also be configured in other forms.

That is, in addition to the normal duct installed in the vehicle, the outer housing part 310 connected to the duct, and the inner housing part 320 configured to be at least partly surrounded by the outer housing part 310, the vent unit 300 may also be provided with a windless grille part 350 to be described later, being located in an opening of the inner housing part 320 and having a windless area formed therein.

Through the above-described configuration, in the vent unit 300, a first discharge path and a second discharge path may be formed between the outer housing part 310 and the inner housing part 320, and thus the first discharge path and the second discharge path may be configured to surround at least a part of the windless area, and more specifically, to surround the border of the windless path (refer to FIG. 3).

Accordingly, through an embodiment of the vent unit 300 as described above, the air being discharged through the duct depending on the driving of the air conditioning unit 100 can be discharged through the first discharge path, the second discharge path, and the windless path, and as a result, the air in the windless form can be complexly discharged together with the air discharge through the first discharge path and the second discharge path.

Meanwhile, the vent unit 300 according to the present embodiment may be further provided with a windless grille part 350 and a rotation adjustment part 360.

The windless grille part 350 is combined to cover the front side of the main path A as illustrated in FIG. 3 and FIG. 5 showing the A-A cross section of FIG. 3.

Here, the windless grille part 350 is combined with the outer housing part 310 so as to expose the first path B and the second path C to outside and to block the main path A (refer to FIG. 3), and since the windless grill part 350 for blocking the main path A as described above is provided with a plurality of fine discharge holes H, the air moving toward the main path A can be discharged into the vehicle interior through the fine discharge holes H in a windless mode.

Further, the rotation adjustment part 360 is connected to the first shutter part 330 and the second shutter part 340, and is provided to be rotated based on a center shaft 360a.

For this, the rotation adjustment part 360 is provided with an operation dial 362, a first operation guide 364, and a second operation guide 366.

The operation dial 362 is rotatably provided, and a part thereof is exposed outwardly of the front side of the vent unit 300.

The operation dial 362 is formed in a circular shape, and a front part thereof exposed outwardly may be in a sawtooth shape so that an effective operation thereof becomes possible when being operated to rotate the first shutter part 330 and the second shutter part 340.

Figure 6A:
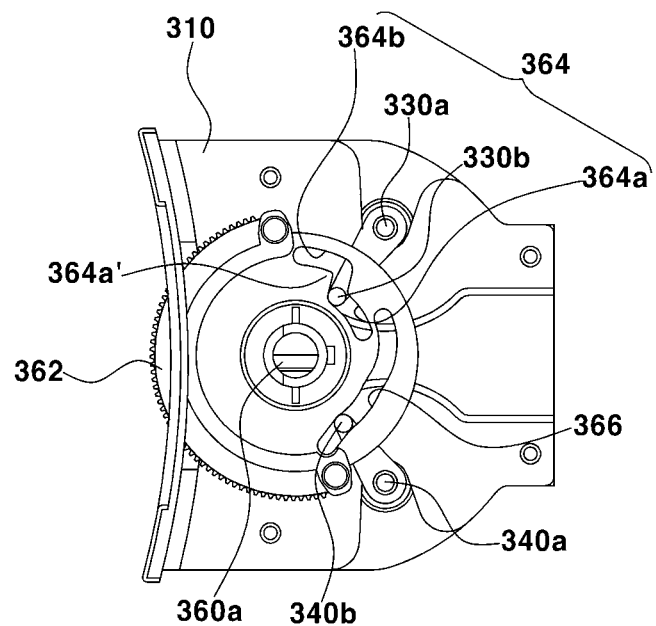
FIG. 6A is a view showing a structure according to a normal mode of a vent unit of an air conditioning device for a vehicle according to an embodiment of the present disclosure.

As illustrated in FIG. 6A, the first operation guide 364 accommodates therein a first transmission shaft 330b connected to a rotation shaft 330a of the first shutter part 330.

The first operation guide 364 having the above structure may guide the operation of the first shutter part 330 by moving the first transmission shaft 330b depending on the rotation of the operation dial 362 in one direction.

In other words, the first operation guide 364 is provided with a first operation path 364a including a bent part 364a' and a second operation path 364b extending from the first operation path 364a, and blocks the second path C (upward mode) or maintains the blocking state of the second path C (windless mode) based on a normal mode to be described later by following the first operation path 364a and the second operation path 364b and guiding the movement of the first transmission shaft 330b.

Further, a second operation guide 366 accommodates therein a second transmission shaft 340b connected to a rotation shaft 340a of the second shutter part 340.

The second operation guide 366 having the above structure may guide the operation of the second shutter part 340 by moving the second transmission shaft 340b depending on the rotation of the operation dial 362 in the other direction.

In the same manner, the second operation guide 366 blocks the first path B (downward mode) or maintains the first path B in an open state (windless mode) based on the normal mode to be described later by guiding the movement of the second transmission shaft 340b depending on the movement of the first transmission shaft 330b from the first operation path 364a to the second operation path 364b.

Figure 6B:
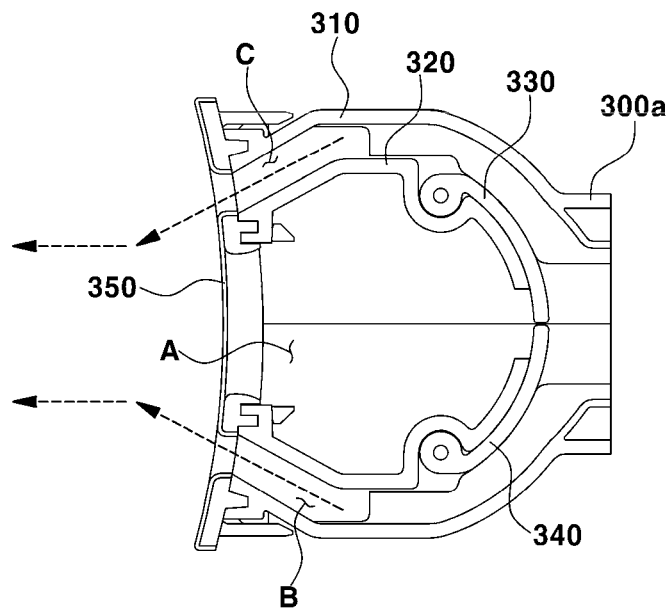
FIG. 6B is a view showing a structure according to a normal mode of a vent unit of an air conditioning device for a vehicle according to an embodiment of the present disclosure.

Referring to FIGS. 6A-6B, the operation in the normal mode will be hereinafter described based on the structure of the roof frame 3.

Normal Mode

The normal mode according to the present embodiment may be defined as a mode in which the first shutter part 330 and the second shutter part 340 block the main path A.

In this state, as illustrated in FIG. 6A, the first transmission shaft 330b is located on a boundary between the first operation path 364a and the bent part 364a' of the first operation path 364a, and at this time, the second transmission shaft 340b is located in a length direction of the second operation guide 366.

Accordingly, when the air conditioning unit 100 is driven, the air blown along the duct unit 200 is supplied to the inside of the outer housing part 310 through the connection duct 300a, and at this time, since the first shutter part 330 and the second shutter part 340 block the main path A as illustrated in of FIG. 6B, the supplied air can be discharged into the vehicle interior along the first path B and the second path C.

Hereinafter, FIGS. 7A, 7B, 8, and 9 are views showing a structure according to an upward mode of a vent unit of an air conditioning device for a vehicle according to an embodiment of the present disclosure.

Based on the structure of the roof frame 3 according to the present embodiment, the operation in an upward mode will be described hereinafter.

Upward Mode

The upward mode according to the present embodiment may be defined as a mode in which the first shutter part 330 blocks the second path C, and the second shutter part 340 maintains the first path B in an open state in the same manner as the above-described normal mode.

Figure 7A:
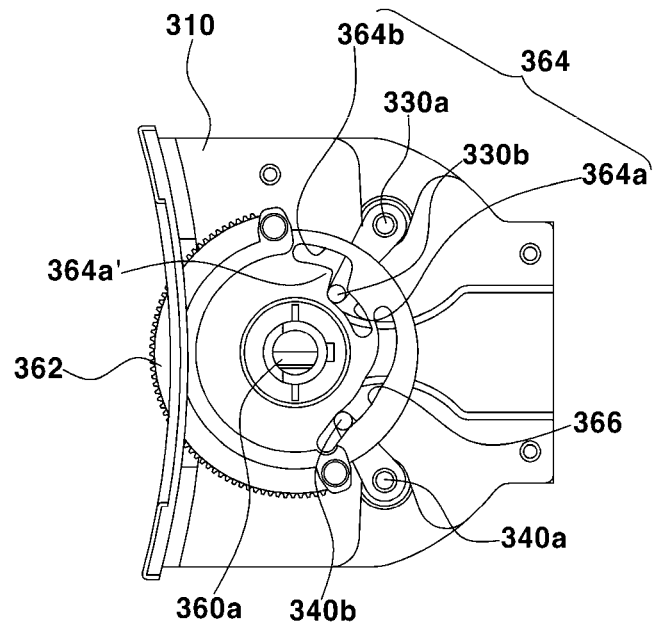
FIG. 7A is a view showing a structure according to an upward mode of a vent unit of an air conditioning device for a vehicle according to an embodiment of the present disclosure
Figure 7B:
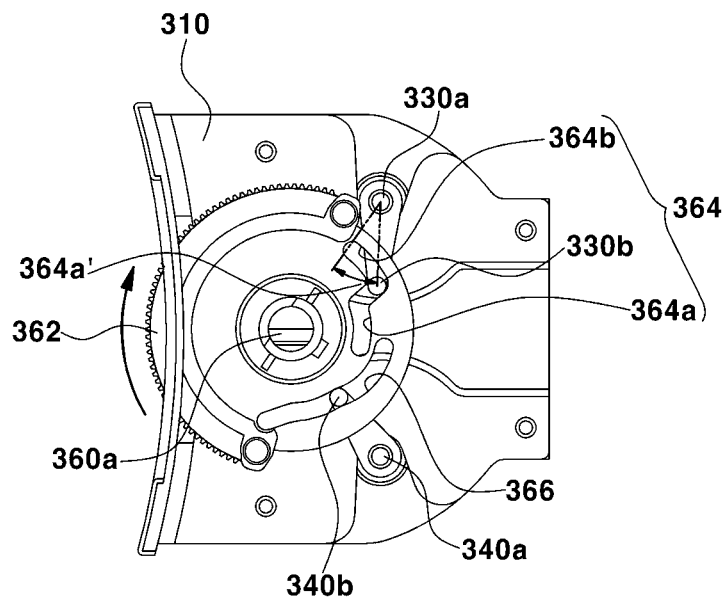
FIG. 7B is a view showing a structure according to an upward mode of a vent unit of an air conditioning device for a vehicle according to an embodiment of the present disclosure

In other words, if the operation dial 362 is rotated in one direction in the normal mode as shown in FIG. 7A, the first transmission shaft 330b, as illustrated in FIG. 7B, moves to the inside of the first operation guide 364, and more specifically, to the bent part 364a' of the first operation path 364a.

Figure 8:
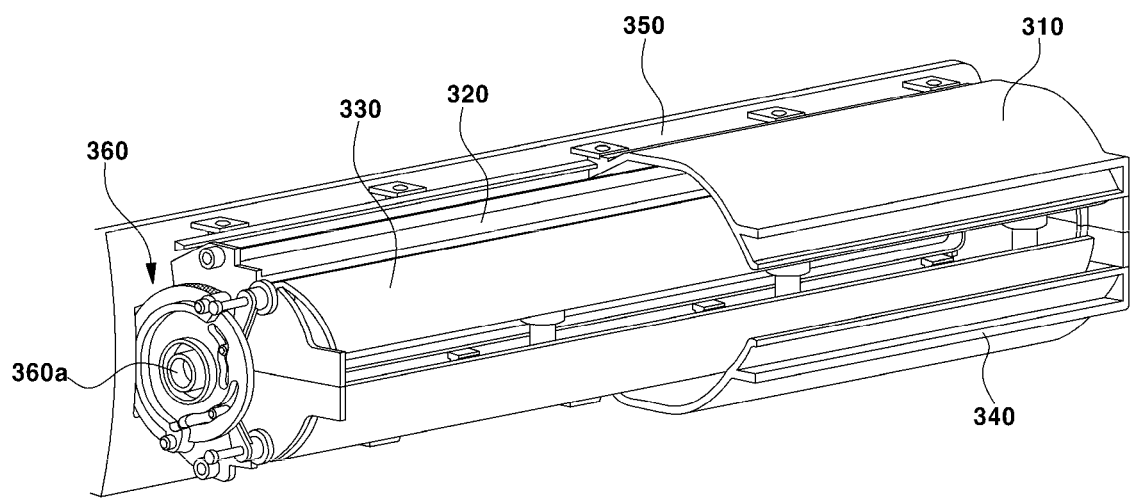
FIG. 8 is a view showing a structure according to an upward mode of a vent unit of an air conditioning device for a vehicle according to an embodiment of the present disclosure

Accordingly, a torque is transferred depending on the movement of the first transmission shaft 330*b* to the bent part 364*a*' of the first operation path 364*a*, resulting in that the first transmission shaft 330*b* is pressed through the bent part 364*a*', and through such rotation movement of the first transmission shaft 330*b*, as illustrated in FIG. 8, the first shutter part 330 is rotated based on the rotation shaft 330*a* to block the second path C.

Figure 9:
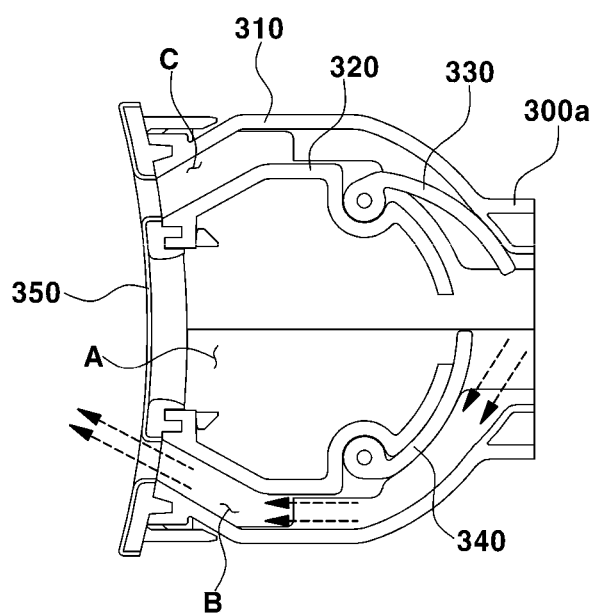
FIG. 9 is a view showing a structure according to an upward mode of a vent unit of an air conditioning device for a vehicle according to an embodiment of the present disclosure.

In this state, since the second path C is blocked through the first shutter part 330 as illustrated in FIG. 9, the air of the air conditioning unit 100 being supplied through the connection duct 300*a* is discharged into the vehicle interior along the first path B, and more specifically, along the first path B and a part of the main path A.

Accordingly, if the vent unit 300 is switched from the normal mode to the upward mode according to the user's operation, the discharged air direction is switched to only the direction toward the roof of the vehicle as compared with the normal mode, and thus the user can implement the cooling mode to fit for the user, resulting in that a pleasant indoor environment can be provided.

Hereinafter, FIGS. 10A, 10B, 11, and 12 are views showing a structure according to a downward mode of a vent unit of an air conditioning device for a vehicle according to an embodiment of the present disclosure.

Based on the structure of the roof frame 3 according to the present embodiment, the operation in a downward mode will be described hereinafter.

Downward Mode

The downward mode according to the present embodiment may be defined as a mode in which the second shutter part 340 blocks the first path B, and the first shutter part 330 maintains the second path C in an open state in the same manner as the above-described normal mode.

Figure 10A:
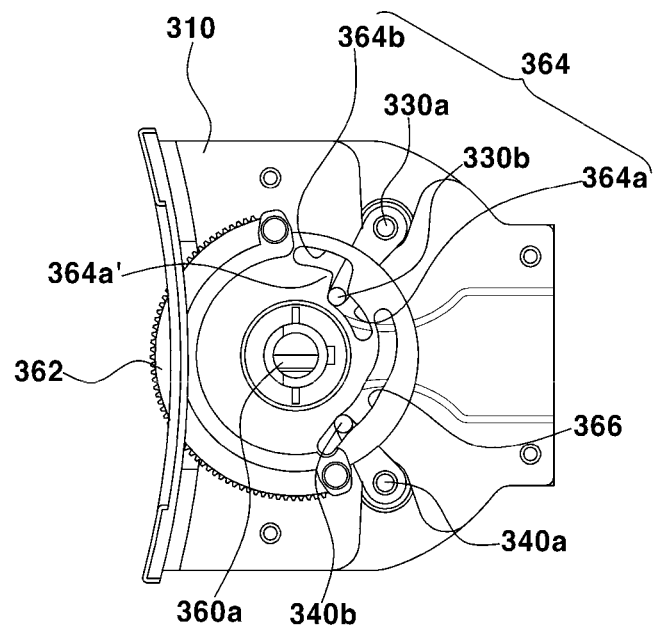
FIG. 10A is a view showing a structure according to a downward mode of a vent unit of an air conditioning device for a vehicle according to an embodiment of the present disclosure.
Figure 10B:
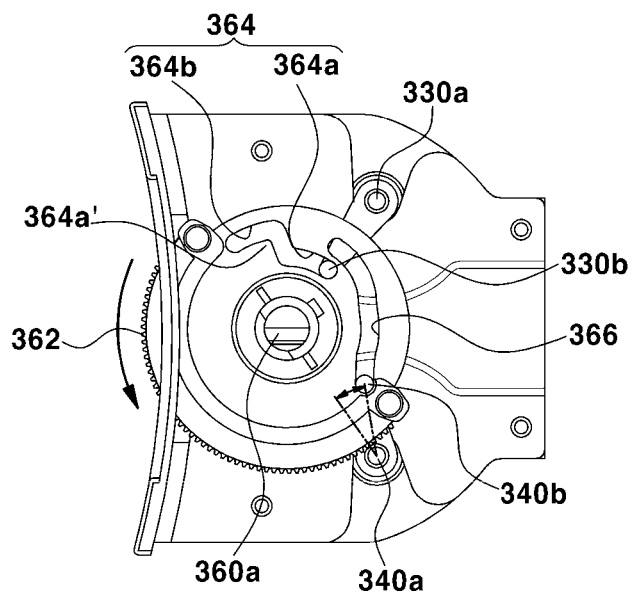
FIG. 10B is a view showing a structure according to a downward mode of a vent unit of an air conditioning device for a vehicle according to an embodiment of the present disclosure.

In other words, if the operation dial 362 is rotated in the other direction in the normal mode as shown in FIG. 10A, the first transmission shaft 330*b*, as illustrated in FIG. 10B, moves to the inside of the first operation guide 364, and more specifically, to the end part of the first operation path 364*a*.

Accordingly, the first transmission shaft 330*b* moves along the first operation path 364*a* and is located to be locked in one end part thereof, and during the movement to the locked location, the first operation path 364*a* does not participate in the rotation movement of the first transmission shaft 330*b*, resulting in that the first shutter part 330 is maintained to open the second path C in the same manner as the location in the normal mode.

Here, while the first transmission shaft 330*b* moves to be locked in the end part of the first operation path 364*a*, the second operation guide 366 guides the movement of the second transmission shaft 340*b* therein, and thus the second shutter part 340 is rotated around the rotation shaft 340*a* to block the first path B.

Figure 11:
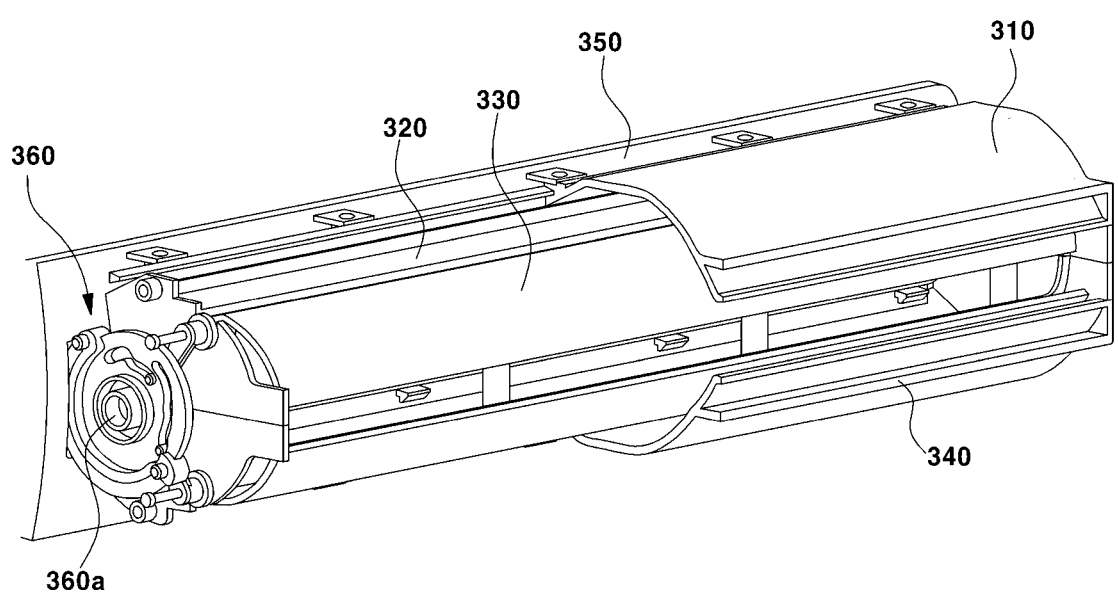
FIG. 11 is a view showing a structure according to a downward mode of a vent unit of an air conditioning device for a vehicle according to an embodiment of the present disclosure.

More specifically, if the operation dial 362 is rotated in the other direction for the switchover from the normal mode to the downward mode, the first transmission shaft 330*b* is located to be locked in the end part of the first operation path 364*a*, and the second transmission shaft 340*b* is rotated to move in a state where it is locked in the one end part of the second operation guide 366, resulting in that the second shutter part 340 blocks the first path B as illustrated in FIG. 11.

Figure 12:
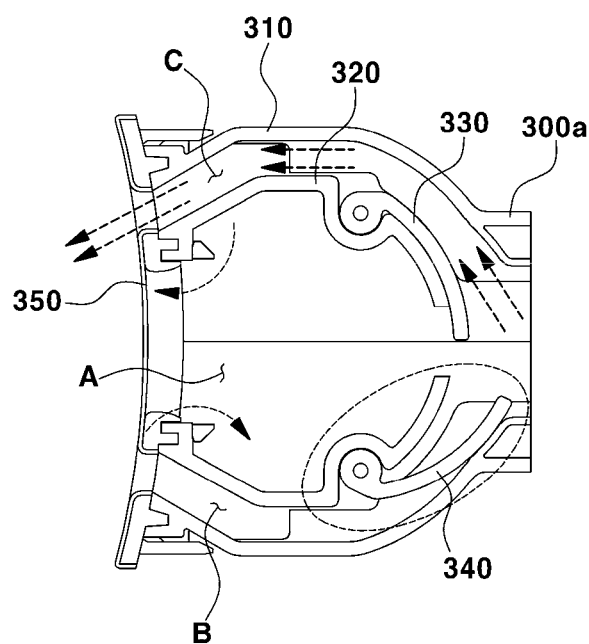
FIG. 12 is a view showing a structure according to a downward mode of a vent unit of an air conditioning device for a vehicle according to an embodiment of the present disclosure.

In this state, since the second shutter part 340 blocks the first path B as illustrated in FIG. 12, the air of the air conditioning unit 100 being supplied through the connection duct 300*a* is discharged into the vehicle interior along the second path C, and more specifically, along the second path C and a part of the main path A.

Accordingly, if the vent unit 300 is switched from the normal mode to the downward mode according to the user's operation, the discharged air direction is switched to only the direction toward the user as compared with the normal mode, and thus the user can implement the cooling mode to fit for the user, resulting in that a pleasant indoor environment can be provided.

Hereinafter, FIGS. 13A, 13B, 14, and 15 are views showing a structure according to a windless mode of a vent unit of an air conditioning device for a vehicle according to an embodiment of the present disclosure.

Based on the structure of the roof frame 3 according to the present embodiment, the operation in a windless mode will be described hereinafter.

Windless Mode

The windless mode according to the present embodiment may be defined as a mode in which the first shutter part 330 blocks the second path C, and the second shutter part 340 blocks the first path B to make the main path A in an open state.

Figure 13A:
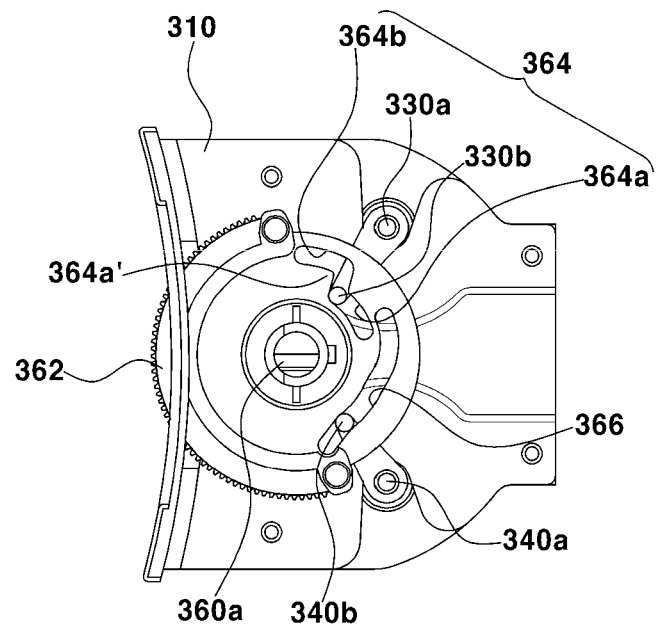
FIG. 13A is a view showing a structure according to a windless mode of a vent unit of an air conditioning device for a vehicle according to an embodiment of the present disclosure
Figure 13B:
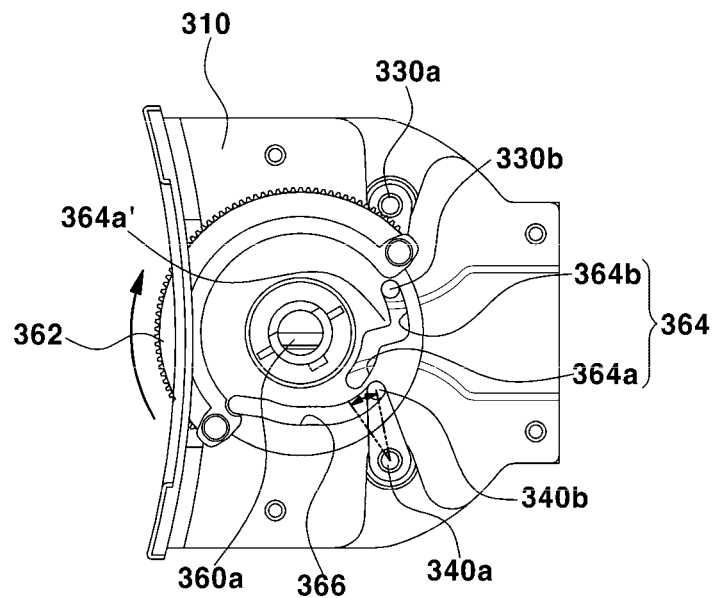
FIG. 13B is a view showing a structure according to a windless mode of a vent unit of an air conditioning device for a vehicle according to an embodiment of the present disclosure

That is, if the operation dial 362 is additionally rotated in one direction in the upward mode as shown in FIG. 13A, the first transmission shaft 330*b*, as illustrated in FIG. 13B, moves to the inside of the first operation guide 364, and more specifically, moves from the bent part 364*a*' of the first operation path 364*a* to the end part of the second operation path 364*b*.

Accordingly, the first transmission shaft 330*b* moves along the second operation path 364*b* and is located to be locked in one end part thereof, and during the movement to the locked location, the second operation path 364*b* does not participate in the rotation movement of the first transmission shaft 330*b*, resulting in that the first shutter part 330 is maintained to block the second path C in the same manner as the location in the upward mode.

Here, while the first transmission shaft 330*b* moves to be locked in the end part of the second operation path 364*b*, the second operation guide 366 guides the movement of the second transmission shaft 340*b* therein, and thus the second shutter part 340 moves to be rotated around the rotation shaft 340*a*.

Figure 14:
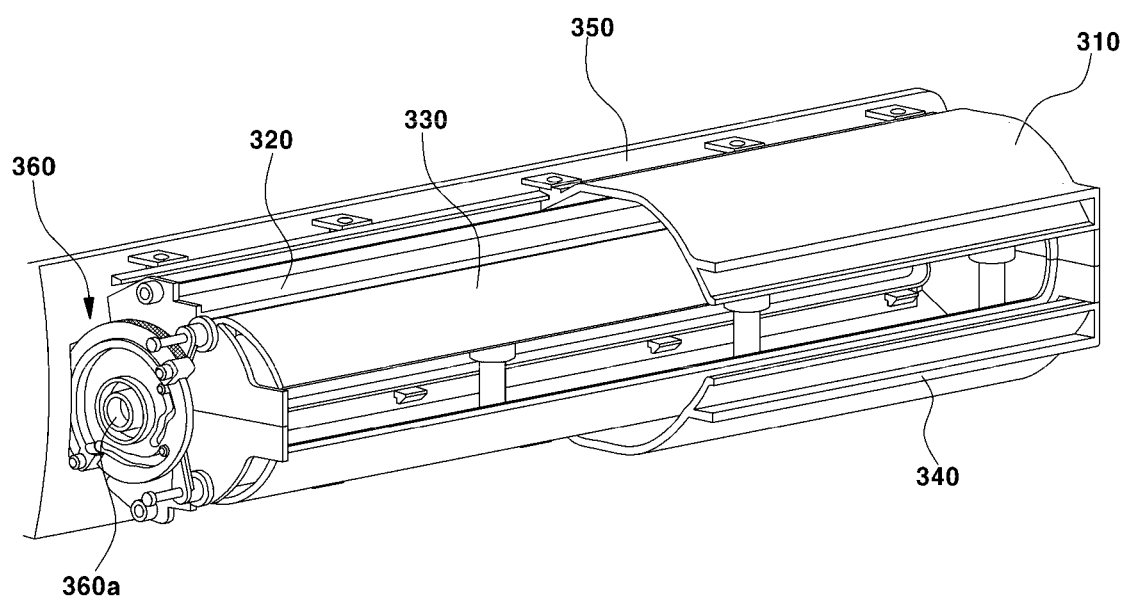
FIG. 14 is a view showing a structure according to a windless mode of a vent unit of an air conditioning device for a vehicle according to an embodiment of the present disclosure

More specifically, if the operation dial 362 is additionally rotated in the one direction for the switchover from the upward mode to the windless mode, the first transmission shaft 330*b* is located to be locked in the end part of the second operation path 364*b* and the first shutter part 330 is maintained to block the second path C in the same manner as the upward mode, and at this time, the second transmission shaft 340*b* is rotated to move in a state where it is locked in the other end part of the second operation guide 366, resulting in that the second shutter part 340 also blocks the first path B as illustrated in FIG. 14.

Figure 15:
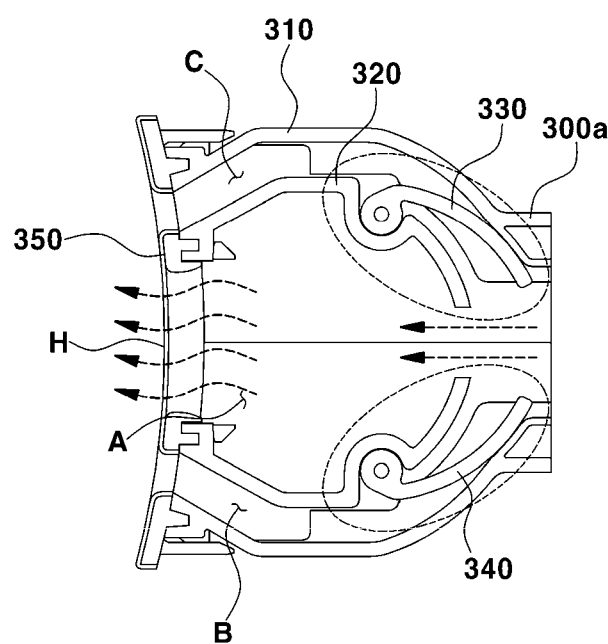
FIG. 15 is a view showing a structure according to a windless mode of a vent unit of an air conditioning device for a vehicle according to an embodiment of the present disclosure.

In this state, since both the first shutter part 330 and the second shutter part 340 block the second path C and the first path B, respectively, as illustrated in FIG. 15, the air of the air conditioning unit 100 being supplied through the connection duct 300*a* is discharged into the vehicle interior along the main path A only.

As described above, in case of switchover to the windless mode according to the user's operation, since the air is adjusted through a plurality of fine discharge holes H provided on the windless grille part 350 and is discharged into the interior, it is possible for the user not to directly face the discharged air, and further, noise being generated during the driving of the cooling mode can be reduced, resulting in that a pleasant indoor environment can be provided.

Figure 16A:
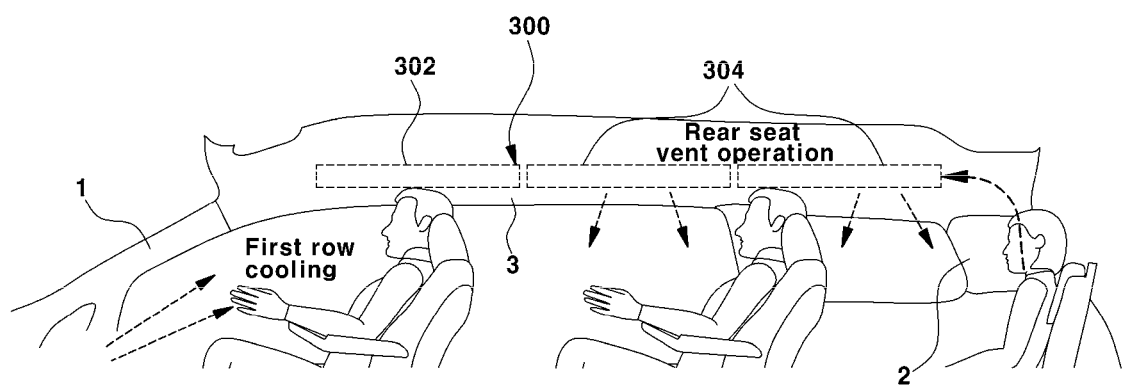
FIG. 16A is a view showing an embodiment in accordance with an operation of an air conditioning device for a vehicle according to an embodiment of the present disclosure.
Figure 16B:
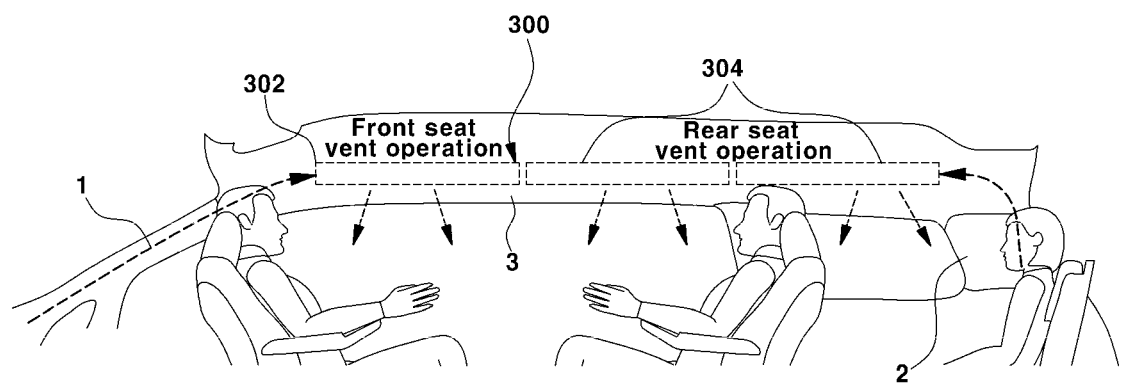
FIG. 16B is a view showing an embodiment in accordance with an operation of an air conditioning device for a vehicle according to an embodiment of the present disclosure.

Hereinafter, FIGS. 16A-16B is a view showing an embodiment in accordance with an operation of an air conditioning device for a vehicle according to an embodiment of the present disclosure.

As illustrated in FIG. 16A, the vent unit 300 according to the present embodiment may be formed to be divided into a front seat vent 302 and a rear seat vent 304 on the side of the roof frame 3.

The front seat vent 302 is connected to the air conditioning unit 100 disposed in the front of the vehicle, and the rear seat vent 304 is connected to the air conditioning unit 100 disposed in the rear of the vehicle through the duct unit 200.

That is, in configuring the vent unit 300, the front seat vent 302 is disposed on the relatively front side, and in the normal mode, i.e., in the mode in which the user who gets in the first row of the vehicle directly drives the vehicle, the air may not be discharged to the front seat vent 302, but may be discharged from a vent of a dashboard.

Further, as illustrated in FIG. 16B, in a face mode in which the user who gets in the first row of the vehicle does not participate in the driving through the autonomous driving, the air is not discharged through the vent of the dashboard, but is discharged through the front seat vent 302, and thus the cooling for a relatively large indoor area can be performed together with the rear seat vent 304.

In configuring the vent unit 300, the rear seat vent 304 is disposed relatively on the rear side, and thus can provide the cooling mode to users who gent in the second or third row of the vehicle independently of the front seat vent 302.

As described above, like the above-described embodiments, both the front seat vent 302 and the rear seat vent 304 can be switched among the normal mode, upward mode, downward mode, and windless mode, and further, can selectively switch the front seat vent 302 to an operable state according to the normal mode or face mode.

Accordingly, in the present embodiment, since the vent unit 300 is divided into the front seat vent 302 and the rear seat vent 304 in consideration of the distributed disposition of the air conditioning unit 100 disposed in the front and rear of the vehicle, and the switchover to a selective operable state is performed for the front seat vent 302, the user can be provided with the pleasant indoor environment with respect to a wide indoor area.

According to the present disclosure, it is possible to set the cooling environment suitable for the occupant through providing of various cooling modes in a manner that in configuring the roof vent connected through the front air conditioner, the rear air conditioner, the tube duct, and the connecting duct, the upper shutter and the lower shutter for shielding the roof vent operate selectively in accordance with adjustment of the rotation angle of the rotary dial, and accordingly, the cooling mode of the vehicle interior is set to the upward mode, the downward mode, or the windless mode.

Further, according to the present disclosure, it is possible to provide the occupant with the pleasant indoor environment in a manner that the roof vent is set to be divided into the front seat vent and the rear seat vent, and in a normal node in which the autonomous driving is not used, cooling through the rear seat vent is performed through the operation of the rear air conditioner, whereas in a face-to-face mode in which autonomous driving is used, cooling through both the front seat vent and the rear seat vent is performed.

Although the present disclosure has been described with reference to the embodiment(s) illustrated in the drawings, this is merely exemplary, and it should be understood that various modifications can be made by those of ordinary skill in the art to which the present disclosure pertains, and all or parts of the above-described embodiment(s) can be selectively combined and configured. Accordingly, authentic technical protection range of the present disclosure should be determined by the technical idea of the appended claims.

What is claimed is:

1. An air conditioning device for a vehicle, the device comprising:
    an air conditioning unit disposed in at least one of front or rear of the vehicle;
    a duct unit blowing air of the air conditioning unit into an interior and extending inside of at least one of a front pillar or a rear pillar; and
    a vent unit communicating with the duct unit through a connecting duct and selectively opening and closing a discharge path of at least one of a main path, a first path, or a second path so as to discharge the blown air to a side of a roof frame,
    wherein the vent unit comprises:
    an outer housing part connected to the connecting duct;
    an inner housing part mounted inside the outer housing part and forming the discharge path;
    a first shutter part rotatably mounted inside the outer housing part and selectively blocking the second path; and
    a second shutter part rotatably mounted inside the outer housing part and selectively blocking the first path,
    wherein the vent unit further comprises a rotation adjustment part connected to the first shutter part and the second shutter part together, and being rotated around a center shaft,
    wherein the adjustment part comprises:
    an operation dial having a part exposed out of the vent unit and being rotatably provided;
    a first operation guide accommodating therein a first transmission shaft connected to a rotation shaft of the first shutter part and guiding an operation of the first shutter part by moving the first transmission shaft depending on rotation of the operation dial in one direction; and
    a second operation guide accommodating therein a second transmission shaft connected to a rotation shaft of the second shutter part and guiding an operation of the second shutter part by moving the second transmission shaft depending on rotation of the operation dial in the other direction.

2. The air conditioning device of claim 1, wherein the vent unit further comprises a windless grille part combined to cover a front side of the main path and provided with a plurality of fine discharge holes through which the air in the main path is discharged.

3. The air conditioning device of claim 1, wherein the vent unit is switched to a normal mode for blocking the main path through the first shutter part and the second shutter part in accordance with a user's operation.

4. The air conditioning device of claim 1, wherein the vent unit is switched to an upward mode for selectively blocking the second path by rotating the first shutter part in accordance with a user's operation.

5. The air conditioning device of claim 1, wherein the vent unit is switched to a downward mode for selectively blocking the first path by rotating the second shutter part in accordance with a user's operation.

6. The air conditioning device of claim 1, wherein the vent unit is switched to a windless mode for selectively blocking the first path and the second path by rotating the first shutter part and the second shutter part in accordance with a user's operation.

7. The air conditioning device of claim 1, wherein the first operation guide comprises:
   a first operation path for blocking the second path through the first shutter part by guiding a movement of the first transmission shaft through a bent part depending on the rotation of the operation dial in the one direction; and
   a second operation path extending from the first operation path, and maintaining a blocking state of the second path through the first shutter part by guiding the movement of the first transmission shaft depending on an additional rotation of the operation dial in the one direction.

8. The air conditioning device of claim 7, wherein the second operation guide makes the first path blocked through the second shutter part by moving the second transmission shaft depending on the movement of the first transmission shaft from the first operation path to the second operation path.

9. The air conditioning device of claim 1, wherein the vent unit is formed to be divided into a front seat vent and a rear seat vent on the side of the roof frame,
   wherein the front seat vent is connected to the air conditioning unit disposed in the front of the vehicle, and the rear seat vent is connected to the air conditioning unit disposed in the rear of the vehicle.

\* \* \* \* \*